US009805032B2

(12) United States Patent
Sagar

(10) Patent No.: US 9,805,032 B2
(45) Date of Patent: Oct. 31, 2017

(54) CLIENT-SERVER PROTOCOL

(75) Inventor: Richard Bryan Sagar, Santa Clara, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1001 days.

(21) Appl. No.: 10/323,007

(22) Filed: Dec. 18, 2002

(65) Prior Publication Data

US 2003/0233375 A1    Dec. 18, 2003

Related U.S. Application Data

(60) Provisional application No. 60/388,763, filed on Jun. 14, 2002.

(51) Int. Cl.
  *G06F 7/00*    (2006.01)
  *G06F 17/30*   (2006.01)
  *H04L 29/06*   (2006.01)

(52) U.S. Cl.
  CPC .. *G06F 17/30017* (2013.01); *G06F 17/30598* (2013.01); *H04L 29/06* (2013.01); *H04L 67/42* (2013.01)

(58) Field of Classification Search
  CPC ............... G06F 19/3487; G06F 19/363; G06F 11/3086; G06F 17/30864; G06F 17/30867; G06F 9/466; G06Q 30/06; G06Q 10/087; G06Q 30/0601; G06Q 30/0242; G06Q 30/0277; G06Q 30/0633; G06Q 30/0641; G06Q 30/0643; G06Q 40/04; G06Q 30/0635; G06Q 30/0639; Y10S 707/99933; Y10S 707/99935

USPC ........ 707/1–104.1, 708, 758, 771, 752–753, 707/791, 793, 828–831, 731; 709/203; 711/205

See application file for complete search history.

(56) References Cited

U.S. PATENT DOCUMENTS

| 5,146,590 | A |   | 9/1992  | Lorie et al. |
| 5,469,354 | A | * | 11/1995 | Hatakeyama ..... G06F 17/30011 |
| 5,757,983 | A | * | 5/1998  | Kawaguchi ....... G06F 17/30675 382/218 |
| 5,842,207 | A |   | 11/1998 | Fujiwara et al. |
| 6,160,552 | A | * | 12/2000 | Wilsher et al. ............... 715/739 |
| 6,418,421 | B1|   | 7/2002  | Hurtado et al. |
| 6,490,589 | B1|   | 12/2002 | Leach et al. .................. 707/100 |

(Continued)

FOREIGN PATENT DOCUMENTS

| EP | 0990995 A2  | 4/2000 |
| EP | 1251437 A2  | 10/2002 |

(Continued)

OTHER PUBLICATIONS

Zissopoulos, J, et al: "An Architecture for Group Commnications-Support Networked Multimedia Applications" Conference Proceeding Article, Jun. 23, 1997, p. 106-115.

*Primary Examiner* — Tony Mahmoudi
*Assistant Examiner* — Linh Black

(57) ABSTRACT

A system including a client and a server in a client-server architecture. The client transmits requests to the server for content subject to a sorting criterion that is ultimately used to sort results of the search. The server identifies an item matching the sorting criterion from its items collection. The server further generates an identifier for the directory item. The identifier is generated from the sorting criterion and is transmitted to the client. The client uses the identifier to sort the matching items.

20 Claims, 2 Drawing Sheets

(56) References Cited

U.S. PATENT DOCUMENTS

| | | | |
|---|---|---|---|
| 6,513,032 B1* | 1/2003 | Sutter | G06F 17/30873 |
| 6,513,038 B1 | 1/2003 | Hasegawa et al. | |
| 6,545,209 B1* | 4/2003 | Flannery et al. | 84/609 |
| 6,609,106 B1* | 8/2003 | Robertson | G06Q 10/02 |
| | | | 705/14.36 |
| 6,953,886 B1* | 10/2005 | Looney | G06F 17/30017 |
| | | | 369/30.08 |
| 6,985,905 B2* | 1/2006 | Prompt et al. | 707/829 |
| 7,013,289 B2* | 3/2006 | Horn | G06Q 10/087 |
| | | | 705/14.51 |
| 7,146,367 B2* | 12/2006 | Shutt | 709/217 |
| 7,480,627 B1* | 1/2009 | Van Horn et al. | 705/26.2 |
| 2001/0011239 A1* | 8/2001 | Kondoh | G06Q 30/06 |
| | | | 705/26.8 |
| 2002/0007321 A1* | 1/2002 | Burton | 705/26 |
| 2002/0010656 A1* | 1/2002 | Suib | 705/27 |
| 2002/0016729 A1* | 2/2002 | Breitenbach et al. | 705/9 |
| 2002/0062249 A1* | 5/2002 | Iannacci | G06Q 20/10 |
| | | | 705/14.1 |
| 2002/0095306 A1* | 7/2002 | Smith | G06Q 10/08 |
| | | | 705/333 |
| 2002/0099622 A1* | 7/2002 | Langhammer | 705/26 |
| 2002/0103789 A1* | 8/2002 | Turnbull et al. | 707/3 |
| 2002/0113824 A1* | 8/2002 | Myers, Jr. | G06F 3/0481 |
| | | | 715/810 |
| 2002/0124004 A1* | 9/2002 | Reed | G06F 17/30038 |
| 2002/0152222 A1* | 10/2002 | Holbrook | G06F 17/30696 |
| 2002/0174430 A1* | 11/2002 | Ellis | G11B 27/005 |
| | | | 725/46 |
| 2002/0184116 A1* | 12/2002 | Tam | G06Q 30/0641 |
| | | | 705/27.1 |
| 2003/0033205 A1* | 2/2003 | Nowers et al. | 705/26 |
| 2003/0093790 A1* | 5/2003 | Logan et al. | 725/38 |
| 2003/0140044 A1* | 7/2003 | Mok | G06Q 50/22 |
| 2007/0203799 A1* | 8/2007 | Caballero | G06Q 30/06 |
| | | | 705/26.4 |

FOREIGN PATENT DOCUMENTS

| | | | |
|---|---|---|---|
| JP | 11265393 A | 9/1999 | |
| JP | 2001297089 A | 10/2001 | |
| WO | WO 01 75652 | 10/2001 | G06F 17/00 |
| WO | 0227557 A1 | 4/2002 | |

* cited by examiner

CLIENT-SERVER PROTOCOL

CROSS REFERENCE TO RELATED APPLICATIONS

This application claims priority to provisional patent application Ser. No. 60/388,763 filed Jun. 14, 2002.

FIELD OF THE INVENTION

The invention relates to a client-server architecture and a method for querying a server about its available content. The invention further relates to a naming convention for referencing directory items.

BACKGROUND OF THE INVENTION

Multimedia content, e.g. photos, video clips, text files, game files, audio files, may be stored on a multitude of servers and repositories that clients can access when needed or upon request by a user. Different levels of security and authorization may be put in place to protect access to these servers. Some servers may be publicly available whereas other ones may necessitate a prior authorization check before any access can be granted thereby only letting authorized users access the stored content. In addition, data communications between a client and accessed servers may be encrypted to provide a higher level of security thus protecting the communication from eavesdropping, unauthorized access and data corruption. This is especially true for communications among clients and servers over a wireless medium.

Technologies, on which servers and memories can be built, may vary from one vendor to another and, in some instances, may not permit devices of different vendors to interoperate. For example, most servers may have their own way of referencing stored content and one server may not understand another server's indexing of the stored items. The manner of formulating content queries and/or query responses may also depend on the server type. In addition, a given server and/or associated repository may have a richer collection of items than another and, in the instance where both servers do not use the same files naming convention, a client querying them may not be able to compare or classify items received from the two servers.

Problems may therefore arise when servers with large content collections using proprietary indexing and protocols try to collaborate and operate in the same distributed network. Various solutions have been contemplated to partly solve these issues. One solution is to gather knowledge of data available at each server and centralize this knowledge at one point in the network for future reference and queries to the servers. Such centralized knowledge is often referred to as a directory service of a distributed computing environment. In massively distributed information systems, it can be expensive and in some cases almost impossible to centrally index all the information due to the large number of information sources available. Other strategies may be employed to conduct searches that cover numerous servers. For example, a client may contact only those sources that may have relevant data or, intermediate servers may reroute client's requests following a hierarchical mapping of the servers.

A method for formulating queries in a distributed information system is disclosed in U.S. Pat. No. 6,490,589 issued Dec. 3, 2002 to Weider. This document pertains to a distributed directory service including data sources, index servers and a client. The proposed method involves generating information indicative of a mapping of the schema of each data source to the schema of its corresponding index server. The mapping information for each data source is provided to its index server. Upon receiving a query from a client at a particular index server, the mapping information for a selected data source is used to rewrite the query, and the rewritten query is provided to the client. Typically, the mapping information will be provided to the client along with a referral to the selected data source. The client may then use the referral to submit the rewritten query to the selected source. The rewritten query is formulated so as to be compatible with the schema used by the selected source.

The solution proposed by the above-mentioned US patent document is designed for large distributed networks but may turn out relatively less efficient for smaller networks of information sources. Indeed, such solution may overload the communication traffic over small networks and the rewrite of commands may not enable prompt query response as it can be expected on less populated networks.

SUMMARY OF THE INVENTION

An object of one or more embodiments of the invention is to provide a system where the client can easily communicate with a multitude of servers and query these servers in a uniform way.

Another object of one or more embodiments of the invention is to enable a transparent classification of directory items at the client irrespective of wherefrom the items originate.

To this end, a system of the invention comprises a client that communicates with at least one server. The server is associated with an information source comprising directory items that the server can retrieve. The client is configured to issue a request for content subject to a sorting criterion. In response to the query, the server identifies one of the directory items based on the sorting criterion. The server also generates from the sorting criterion an item identifier associated with the directory item. The server further provides this item identifier to the client.

In one context of application of the invention, the information source stores multimedia files such as audio files, video clips, movie files, text files, animation files, executable files, e.g. games, or interactive files, also referred to as directory or content items in the invention. It must be noted that the information source may be built separately from the server or may be an integral part of the server. A user at the client may desire to conduct searches on these directory items based on one or more sorting criterion depending on what the user is interested in. The user may also desire to have the content items that match the search sorted according to said one or more sorting criterion. For example, the user may query servers by genres, titles or time periods. The client generates a request based on at least one sorting criterion and transmits this request to one or more servers present in the system. Each server is capable of interpreting the query request and may identify one or more directory item that matches the sorting criterion. Thereafter, the server generates an identifier for that directory item for further transmission to the client as part of its response to the client. According to the invention, the identifier is generated from the sorting criterion. In an embodiment of the invention, the identifier may comprise the sorting criterion as it was transmitted by the client to the server or the identifier may comprise data representative of the sorting criterion. In another embodiment, the identifier may also comprise data respecting the item's one or more characteristic that matches the sorting criterion. For example, assuming the sorting criterion was a date of recording of songs, the identifier associated with a given song may comprise the actual date, the month or the year on which the song was recorded.

In an embodiment of the invention, multiple queried servers use the same naming convention when generating identifiers associated with respective content items. Consequently, when the client receives multiple identifiers from several servers, it may be able to compare the identifiers. The client may thereafter combine all received identifiers irrespective of the servers from which they were received and rank them based on the sorting criterion. An advantage of the invention is to enable a transparent communication scheme from the servers to the client so that the client can receive queries responses and classify content items referenced to in servers' responses irrespective of the actual servers issuing the responses.

In another embodiment, the server transmits along with the identifier, displayable data that enables a user to identify the item when displayed. For example, such displayable data may comprise a title of a song, an artist's name, a movie title and the like. In this embodiment, the client may classify received items based on their respective identifiers and once the items are classified, the client may generate a user-friendly list comprised of the displayable data respectively associated with the content items. The client may display this list to the user for selection and play out of one of the items.

BRIEF DESCRIPTION OF THE DRAWING

The invention is explained in further details, by way of examples, and with reference to the accompanying drawing wherein.

Elements within the drawing having similar or corresponding features are identified by like reference numerals.

DETAILED DESCRIPTION

Figure 1:
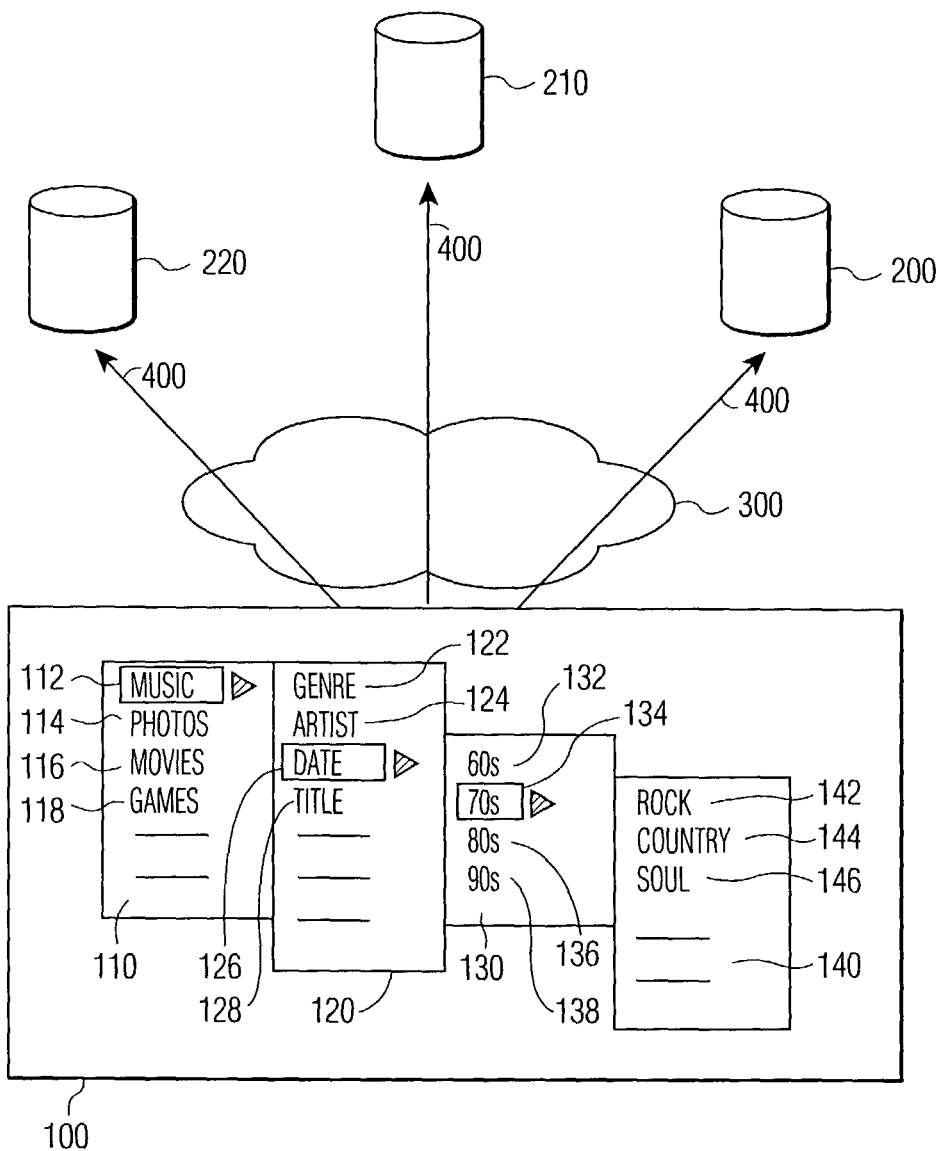
FIG. 1 a system of the invention.

The invention pertains to a system, of which an embodiment is depicted in FIG. 1 comprising a client 100 and a multitude of servers 200, 210 and 220. FIG. 1 shows the invention in the context of a home multimedia entertainment system where the user can play out on client 100 multimedia content stored at servers 200-220. Client 100 and servers 200-220 communicate over a network 300, which is a wired network, a wireless network or a combination of both.

Client 100 is, for example, a cell-phone, a personal digital assistant, a set top box associated with a TV set or a portable tablet personal computer that the user carries around the home or the office. Client 100 may be equipped with a transceiver for communicating over network 300, a display, e.g. touch screen display, a user interface enabling the user to input selections and a processing unit for processing user's requests and presenting content to the user. These various elements of client 100 are well-known in the art and are not represented here.

Servers 200-220 may be accessible over a public network, e.g. the Internet, or over a private network such as an IEEE 802.11 compliant home network using for instance a TCP/IP protocol. As will be shown hereinafter, servers 200-220 may be comprised of an internal repository or database or, alternately, may be associated with a remote or local external repository. As used herein, the term "server" indicates the program, the physical device or the computer that awaits and fulfills requests from a client or, alternately indicates the combination of server and associated repository where content items are stored. In the following, both definitions will be used indifferently. Servers 200-220 may be professional servers with associated databases, home personal computers, home servers or home gateways storing content items such as MP3 files, video files, digital photos.

FIG. 1 shows the current display of portions of menus of client 100. The displayed menus 110, 120, 130 and 140 enable the user to select respective subsets of content items from servers 200-220 and have these subsets combined, classified and displayed to the user for subsequent selection, retrieval, rendering or play-out. To this end, the user may specify one or more sorting criterion from menus 110-140 to have initial searches conducted on servers 200-220 and the results of these searches may be later classified for presentation to the user.

For example, menu 110 which belongs to a first tier of menus, offers at least four options representative of types of content items: option 112 refers to music files, option 114 refers to photos files, option 116 refers to movies and option 118 refers to games. In this embodiment, the user wishes to conduct a query on servers 200-220 for music files and option 112 is therefore highlighted.

A second level of menus may be displayed upon selection of option 112 and menu 120, which comprises sorting criteria specific to the selected music files option 112, may be presented to the user. Menu 120 comprises at least four categories: genre 122, artist 124, date 126 and title 128. For example, the genre category 122 may comprise various music styles such as rock, classical, blues, etc. . . . The user has highlighted category "date" 126 and a menu 130 of a third tier of menus may be displayed.

Menu 130 comprises four potential sorting criteria pertaining to the date category: criterion 132 "music from the sixties", criterion 134 "music from the seventies", criterion 136 "music from the eighties" and criterion 138 "music from the nineties". The user has selected criterion 134 and, upon request, may cause a query 400 to be issued to servers 210-230. However, in this embodiment, the user may desire to further narrow down his search by genre of music such as displayed in menu 140 giving music styles associated with the decade the user is interested in. In another embodiment, the user may also narrow down his search by year or artist, in lieu of, or in combination with the genre limitation.

Thus, once the user has selected one or more sorting criteria, e.g. option 112 "music", option 126 and option 134 "70s", client 100 may then issue a request 400 for relevant content items to servers 200-220. Request 400 may be automatically issued when the user has selected one or more sorting criteria or, alternately, request 400 may be issued upon further input and confirmation by the user of the sorting criteria. Client 100 may broadcast request 400 to all servers accessible from client 100 or alternately client 100 may send request 400 only to those servers that are likely of storing content items of interest. For example, a server known by client 100 as storing digital pictures only will not be queried. In another embodiment, client 100 may generate and issue specific requests for each server 200-220 depending on the query protocol accepted by each server. Request 400 may comprise the one or more sorting criterion representative of the user's interests at that instant. For example, in the embodiment of FIG. 1, request 400 may comprise data indicative that the user is interested in music files from the seventies. In this embodiment, the sorting criterion "time" may represent the song recording date or the song release date.

It must be noted that client 100 may transmit request 400 upon the user entering one sorting criterion only. For example, the user may select one of the options 112-118 from the first menu 110 and client 100 may generate request 400 using a default sorting criterion. Thus, if the user does not specify a particular manner of having the content items sorted, client 100 may use a default order parameter such as alphabetical classification by artist name, age classification, classification by director for movies, alphabetical classification by titles for movies and the like. Such default parameter is transmitted to servers 200-220 which in response generate the respective identifiers for the respective identified items based on this default parameter. For example, if the user selects option 116 thereby indicating that he is only interested in movies, then client 100 may generate the request 400 based on a default sorting parameter: the director name. In response to request 400, servers 200-220 generate an identifier for each identified movie based on the name of the director of the movie. When client 100 receives the identifiers from servers 200-210, client 100 can regroup identifiers by directors' names, to ultimately form a classified and merged list with all received movies for display to the user. Alternately, when the user specifies an option of one of the menus 110-140, client 100 present the user with a list of possible sorting criteria on how the items should be classified: date, title, alphabetical, etc. . . . instead of using a default sorting parameter.

Figure 2:
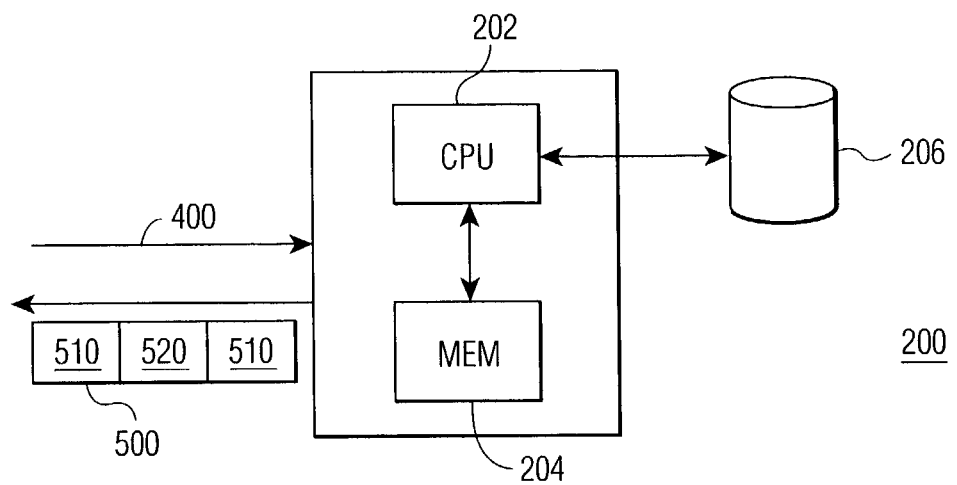
FIG. 2 is a server of the invention.

FIG. 2 is a block diagram of server 200. Server 200 receives request 400 comprises data indicating that the search pertains to songs from the seventies. Request 400 is processed by internal central processing unit 202, which looks up an internal directory of items stored in database 206 of server 200. The items directory may comprise file names and pointers to content items stored in database 206. Such item directory may be stored in memory 204 associated with CPU 202. Memory 204 is, for example, a random access memory enabling quick look up of the stored directory. Each content item may be represented by an entry in the items directory and each content item entry is comprised of entry fields with each field being associated with respective characteristics of the content item. For example, an entry for a given content item may comprise the following fields: content type, artist or editor name, release date, genre, title, length, critics and the like.

Thus, in response to request 400, CPU 202 runs a search on the items directory stored in memory 204 and identifies at least one content item matching the provided sorting criteria: a song from the seventies. Thereafter, CPU 202 generates for the identified item an identifier 510 from one or more of the sorting criteria. In this embodiment, the identifier 510 comprises the release date of the song and CPU 202 generates identifier 510 according to a naming convention commonly known to client 100 and server 200. In an embodiment of the invention, the portion of request 400 comprising the one or more sorting criterion and the portion of identifier 510 comprises data representative of the one or more sorting criterion are both written using alphanumerical characters for ease of interpretation and comparison. For example, identifier 510 may be composed by compounding words representative of the characteristics of the item that matched the sorting criterion. In this embodiment, identifier 510 comprises data representative of the characteristic of the item that matched the sorting criterion 134. Thus, identifier 510 comprises the release date of the identified song using a predetermined format such as for example a six digits consisting of the year followed by the month. In addition, identifier 510 may not necessarily comprise data representative of sorting criterion 112 since all identifiers transmitted by servers 200-220 in response to request 400 will be associated with songs and criterion 112 is therefore true by default. In another embodiment, a common naming algorithm may generate identifiers 510 or a portion of it at each server 200-220. For example, a six characters word is generated for each characteristic of the item matching one sorting criterion, from which the algorithm further generates a four characters checksum. All checksums are then appended in a string to form identifier 510.

It is to be noted that server 210 and 220 also run similar searches on their own database and generate respective identifiers for each content item matching the criteria using the same common naming convention as the one used by server 200.

Response 500 may also comprise in addition to identifier 510, data 520 representative of the identified items for which identifiers 510 is transmitted where data 520 is displayable and enables the user to identify the song. For example, response 500 may also comprise for each identifier 510 the title and the artist of the song associated with the identifier 510.

Server 200 thereafter transmits response 500 to client 100 and response 500 may comprise a predefined maximum number of identifiers 510 that each server 200-220 is allowed to transmit to client 100 based on request 400. Request 400 may have indicated a maximum number of identifiers client 100 desires to receive from each server 200-220. This number may be the same for all servers 200-220 or different numbers may be computed for servers 200-220. A fixed number may also be set by default in servers 200-220.

Server 200 may however have identified more songs matching the transmitted sorting criterion 134 than the maximum number it can transmit in its response 500. Thus, once CPU 204 has identified all songs that match the sorting criterion 134 and once CPU 204 has generated all identifiers for all respective identified songs, CPU 204 may classify these identified songs based on their respective identifiers. Server 200 can thereafter transmit only the identifiers of the first few songs. Server 200 may retain the rest of the list in memory 208 for subsequent use.

Figure 3:
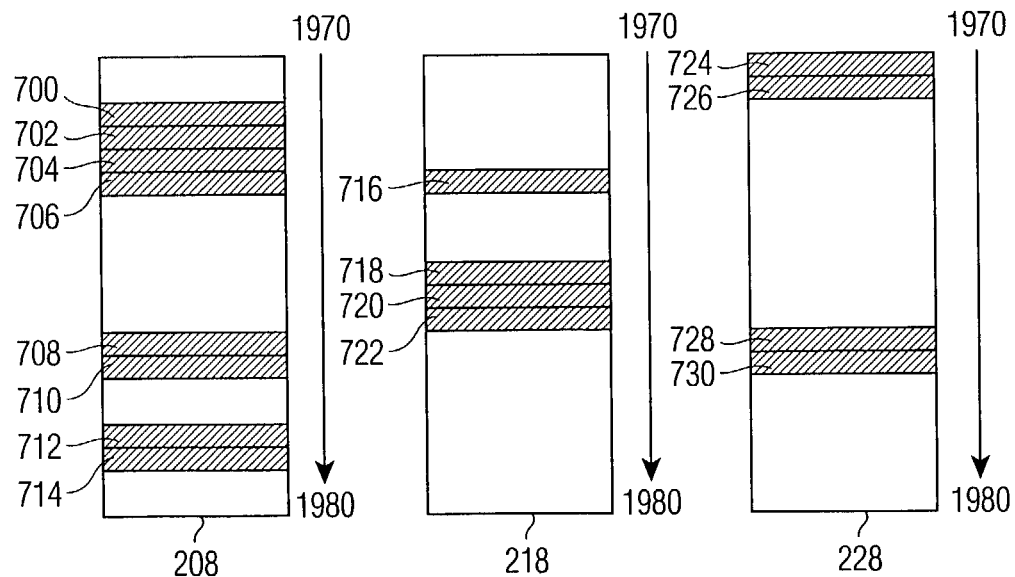
FIG. 3 shows respective items collections of three servers of the invention for a given selection criterion.

FIG. 3 represents respective subsets 208, 218 and 228 of the items collection of servers 200-220 that match the sorting criterion 134. Subset 208 comprises eight songs 702-714 from the seventies. FIG. 3. Subset 218 comprises four songs 716-722 and subset 328 comprises four songs 724-730. Each server 200-220 has ranked the songs of its respective subset 208, 218 and 228 respectively by their release date. Assuming that in response to query 400, each server 200-20 is only allowed to provide a maximum of two identifiers at a time to client 100. Server 200 will therefore transmit identifiers 510 associated with songs 700 and 702 to client 100, server 210 will transmit identifiers associated with songs 716 and 718, server 220 will transmit identifiers associated with songs 724 and 726. Once servers 200-220 have sent responses 500 to client 100, servers 200-220 may keep respective subsets 208, 218 and 228 for further reference or erase them.

Upon reception of the identifiers associated with songs 700, 702, 716, 718, 724 and 726, client 100 compares them and classifies the songs accordingly based on the release date indicated in each identifier. Thus, client 100 will classify the songs as follows: 724, 726, 700, 702, 716 and 718 and client 100 may display to the user this list of songs or a beginning portion of this list. As shown before, the identifiers 510 may have been transmitted with displayable data 520 representative of each song and client 100 displays data 520 to the user. If the user desires to view the next songs in the list, client 100 may transmit a second query to all servers 200-220 indicating the sorting criteria 112, 134 and the release date of the last song displayed to the user. In another embodiment, the second query may comprise a reference to query 400 so that servers 200-220 can easily retrieve subsets 208, 218, 228 respectively and transmit the identifiers of the next songs after the song for which an identifier was last sent.

In another embodiment, servers 200-220 do not classify the content items matching the received one or more sorting criterion and transmit identifiers associated with all matching content items or a subset of these. Client 100 receiving these identifiers may select some of the received identifiers and ignore the other non-selected ones.

It is to be noted that server 200-220 may not transmit the content items in response 500 and that content items may be retrieved or activated upon selection by the user from client 100. The invention is also not limited to video and audio files and the invention also encompasses other directory items such as a directory of hyperlinks, e.g. internet radio hyperlinks that can be sorted by style, country, number of listeners, TV programs or radio programs and the like.

The invention claimed is:

1. A system comprising:
   a server comprising:
   a receiver configured to receive a request from a client for content, the request including one or more sorting criterion based on a type of the content, at least one of the one or more sorting criterion being an ordering criterion;
   a processor unit configured to,
   search, in response to the request, a directory of content-items retrievable by the server, the directory of content-items comprising data associated with characteristics of the content-items;
   identify a directory content-item with at least a characteristic matching the provided one or more sorting criterion;
   generate an identifier for the identified directory content-item, wherein the identifier represents a combination of an identification of the identified directory content item and the ordering criterion, the combination representing a compounding of the identified directory content and the ordering criterion, forming displayable data enabling a user to identify the identified directory content-item from the identifier when the displayable data is displayed;
   a transmitter configured to transmit the identifier and the displayable data to a client, and
   the client configured to:
   transmit to the server the request for content subject to the one or more sorting criterion;
   receive the identifier and the displayable data;
   classify the directory content-item relative to other directory content-items based on the identifier,
   order the received directory content items in the classification based on the ordering criterion portion of the identifier; and
   generate an ordered list of the displayable data respectively associated with the classified content-items.

2. The system of claim 1, wherein the system comprises:
   a plurality of servers using a common protocol to generate identifiers associated with directory content-items.

3. The system of claim 1, wherein the identifier comprises data representative of a characteristic of the directory item matching the sorting criterion.

4. The system of claim 1, wherein the one or more sorting criterion is one of: a genre, artist, title, or date.

5. The system of claim 1, wherein the one or more sorting criterion further comprises:
   a boundary for a value of the sorting criterion.

6. A client comprising:
   a user interface configured to enable a user to indicate one or more sorting criterion for content, at least one of the one or more sorting criterion being an ordering criterion;
   a processor unit configured to generate a request for content comprising data representative of the sorting criterion, the sorting criterion based on the type of content;
   a transmitter configured to transmit the request to a server;
   a receiver configured to:
   receive an identifier for a directory content-item retrievable by the server matching the sorting criterion, and
   generate displayable data enabling a user to identify the directory content-item when the displayable data is displayed, the identifier represents a compounding of the identified directory content item and the ordering criterion,
   the processor unit being configured to:
   classify the directory content-item relative to other directory content-items based on the identifier,
   order the received directory content items based on the ordering criterion portion of the identifier; and
   generate an ordered list comprising the displayable data associated with the classified content-items.

7. The client of claim 6, wherein the identifier comprises a characteristic of the directory item matching the one or more sorting criterion.

8. The client of claim 7, wherein the identifier comprises alphanumerical characters representative of the characteristic.

9. A server comprising:
   a receiver configured to receive a request from a client for content, the content being subject to one or more sorting criterion within the request, at least one of the one or more sorting criterion being an ordering criterion, the one or more sorting criterion being based on a type of the content;
   a processor unit configured to:
   in response to the request, search a directory of content-items retrievable by the server, the directory of content-items comprising data associated with characteristics of the content-items;
   identify a directory content-item with at least a characteristic matching the provided one or more sorting criterion,
   generate an identifier for the identified directory content-item, the identifier representing a combination of an identification of the identified directory content item and the ordering criterion, the combination representing a compounding of the identified directory content and the ordering criterion, forming displayable data enabling a user to identify the directory content-item when the displayable data is displayed;

order the directory content items based on the ordering criterion portion of the identifier; and a transmitter configured to transmit the identifier and the displayable data to the client in based on the order of the directory content items.

10. The server of claim 9, wherein the displayable data enables a user to identify the directory item when the displayable data is displayed.

11. A method comprising:

in a client:
receiving from a user interface of the client, one or more sorting criterion for content, at least one of the one or more sorting criterion representing an ordering criterion, the one or more sorting criterion being based on a type of a content;
generating a request for content comprising data representative of the one or more sorting criterion;
transmitting the request from the client to a server;
receiving an identifier for a directory content-item retrievable by the server and matching the one or more sorting criterion, wherein the identifier representing a compounding of an identification of the identified directory content item and the ordering criterion forming displayable data enabling a user to identify the directory content-item when the displayable data is displayed;
classifying the directory content-item relative to other directory content-items based on the identifier;
ordering, via the processor unit, the directory content items based on the ordering criterion portion of the identifier; and
generating, via the processor, an ordered list comprising the displayable data respectively associated with the classified content-items.

12. A method comprising:

in a server:
receiving, into a receiver, a request for content from a client, the request including—on one or more sorting criterion, at least one of the one or more sorting criterion representing an ordering criterion, the one or more sorting criterion being based on a type of the content;
searching via a processor unit, a directory of content-items retrievable by the server, the directory of content-items comprising data associated with characteristics of the content-items;
identifying via the processor unit, a directory content-item with at least a characteristic matching the provided one or more sorting criterion;
generating, by the processor unit an identifier for the directory content-item, the identifier being representing a compounding of an identification of the identified directory content item and the ordering criterion from the one or more sorting criterion forming displayable data enabling a user to identify the directory content-item when the displayable data is displayed;
ordering, via the processor unit, the directory content items based on the ordering criterion portion of the identifier; and
transmitting, via a transmitter, the identifier and the displayable data to the client based on the order of the directory content items.

13. The client of claim 6, wherein the identifier comprises data representative of a characteristic of the directory item matching the sorting criterion.

14. The client of claim 6, wherein the one or more sorting criterion is one of a genre, artist, title or date.

15. The system of claim 6, wherein the one or more sorting criterion further comprises a boundary for a value of the sorting criterion.

16. The client of claim 9, wherein the identifier comprises data representative of a characteristic of the directory item matching the sorting criterion.

17. The client of claim 9, wherein the one or more sorting criterion is one of: a genre, artist, title or date.

18. The system of claim 9, wherein the one or more sorting criterion further comprises a boundary for a value of the sorting criterion.

19. A computer-readable storage-medium that is not a transitory propagating signal or wave, the medium comprising control instructions configured to control a client for performing the method of claim 11.

20. A computer-readable storage-medium that is not a transitory propagating signal or wave, the medium comprising control instructions configured to control a server for performing the method of claim 12.

* * * * *